United States Patent [19]

Johnson

[11] 4,382,631

[45] May 10, 1983

[54] STABILIZED DUMP TRAILER

[75] Inventor: Don R. Johnson, Wolfforth, Tex.

[73] Assignee: Harris & Thrush Manufacturing Company, Wolfforth, Tex.

[21] Appl. No.: 264,341

[22] Filed: May 18, 1981

[51] Int. Cl.³ .............................. B60P 1/16; B60S 9/12
[52] U.S. Cl. ................................. 298/17 SG; 91/443; 91/512; 280/764.1; 298/18
[58] Field of Search ................... 298/17 S, 17 SG, 18, 298/22 C; 212/189; 91/443, 512, 534; 280/764

[56] References Cited

U.S. PATENT DOCUMENTS

| | | | |
|---|---|---|---|
| 2,350,141 | 5/1944 | Wood | 298/17 SG X |
| 2,470,778 | 5/1949 | Lankovski et al. | 91/443 |
| 3,712,675 | 1/1973 | Schoenwald | 298/17 S X |
| 3,744,653 | 7/1973 | Jensen | 298/17 SG X |
| 3,880,469 | 4/1975 | Harrom | 298/17 SG |
| 4,059,942 | 11/1977 | Trimble et al. | 298/17 S X |
| 4,148,527 | 4/1979 | Steele | 298/18 X |
| 4,236,756 | 12/1980 | Hildebrand et al. | 298/17 SG X |

*Primary Examiner*—Leslie J. Paperner
*Attorney, Agent, or Firm*—Wendell Coffee

[57] ABSTRACT

A seed cotton transport is provided to transport seed cotton from the cotton stripper or harvester to a module builder. The basket upon the trailer or transport is pivoted about a point which is elevated above the sides of the module builder which is approximately eleven feet above the surface of the ground. The pivot is outboard of the wheels of the trailer. In the dump position, the weight is primarily to one side and as indicated above is very high. To prevent the trailer from overturning, stabilizing struts are hydraulicly extended any time the tilt or dump cylinders are pressurized to elevate the basket. A restricted one-way valve is used to insure that the cylinders operate in proper sequence.

2 Claims, 5 Drawing Figures

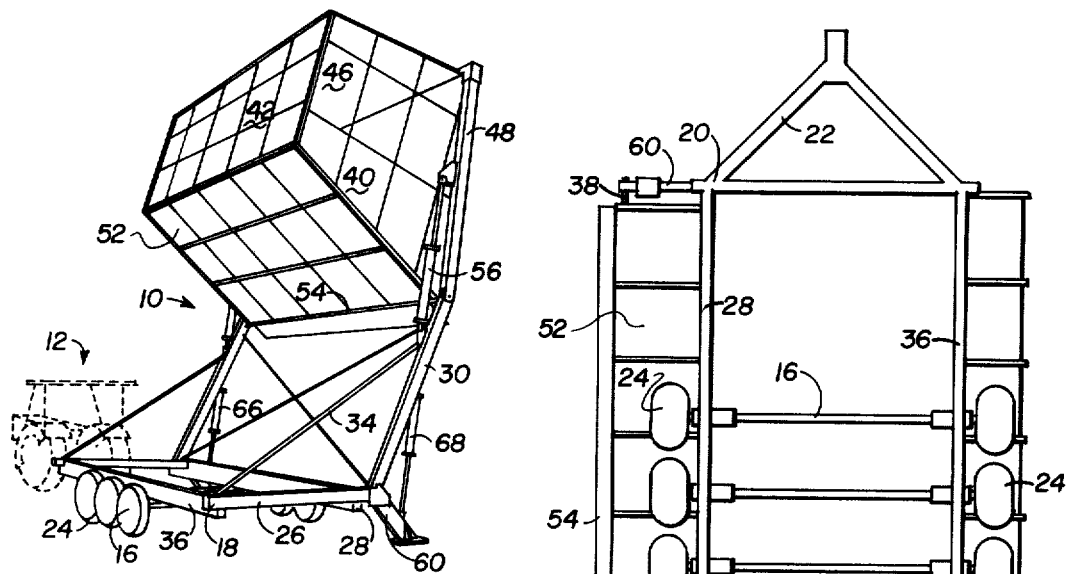
FIG. 2
FIG. 3
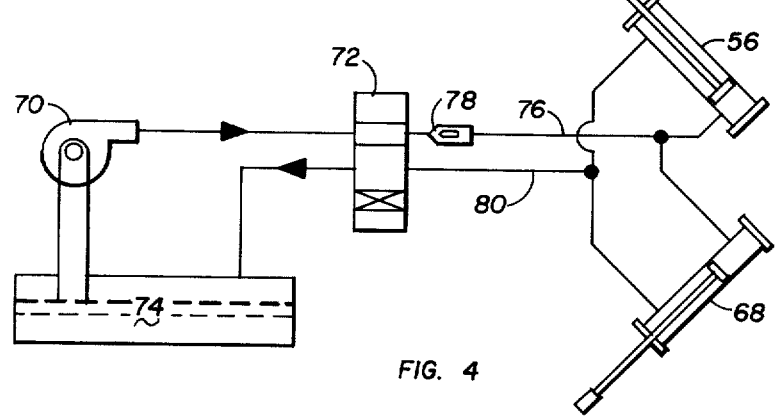
FIG. 4
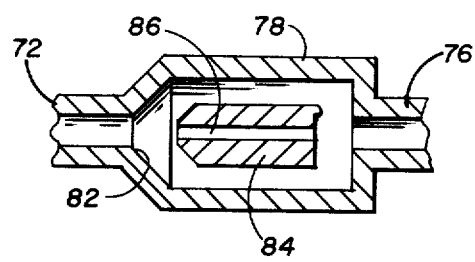
FIG. 5

STABILIZED DUMP TRAILER

BACKGROUND OF THE INVENTION (1) Field of the Invention

This invention relates to seed cotton harvesting and more particularly to transporting harvested seed cotton from a cotton stripper to a cotton module builder.

(2) Description of the Prior Art

Before my invention, workers in the art had provided trailers, or dump baskets, to transport cotton from a cotton harvester to a module builder.

It is necessary to elevate the basket above the top of the module builder, about eleven feet, to dump the cotton into the module builder.

Normally, the trailer is of such light weight that it tends to overturn or be overturned by the wind when it is elevated to sufficient height and to one side as is necessary to properly dump cotton from the basket into the module builder.

SUMMARY OF THE INVENTION (1) New and Different Function

I have solved the problem by providing stabilizing arms, or legs, or struts, or elements, as they might be called, which extend outwardly from the running gear or trailer frame carrying the basket. Any time the basket is being elevated, or is elevated the struts are extended. The stabilizing struts are pivoted to the frame, one at the forward end and one at the after end of the frame.

The strut hydraulic cylinders and the dump cylinders, are designed so that as the hydraulic lines are pressurized, the struts will pivot downward and bear against the ground before the basket is tilted to its elevated position.

Upon reversal of the pressure to permit the basket to be retracted to its transport position after the seed cotton is dumped from it, a restricted passageway is provided so that a certain amount of pressure is maintained upon the cylinders. Therefore, the strut cylinder will remain extended biasing the struts against the ground until the basket is in the full retracted position, at which time, the strut will then be retracted.

Thus it may be seen that the function of the total combination far exceeds the sum of the functions of the individual elements, such as cylinders, braces, stanchions, etc.

(2) Objects of this Invention

An object of the invention is to move seed cotton from a harvester to a module builder.

Further objects are to achieve the above with a device that is sturdy, compact, durable, lightweight, simple, safe, efficient, versatile, ecologically compatible, energy conserving, and reliable, yet inexpensive and easy to manufacture, operate and maintain.

Other objects are to achieve the above with a method that is versatile, ecologically compatible, energy conserving, rapid, efficient, and inexpensive, and does not require skilled people to operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 2 is a perspective view thereof attached to a tractor.

FIG. 3 is a bottom plan view thereof.

FIG. 4 is a schematic representation of the hydraulic connections thereof.

FIG. 5 is a sectional detail of the special check valve thereof.

DESCRIPTION OF THE PREFERRED EMBODIMENT

Figure 1:
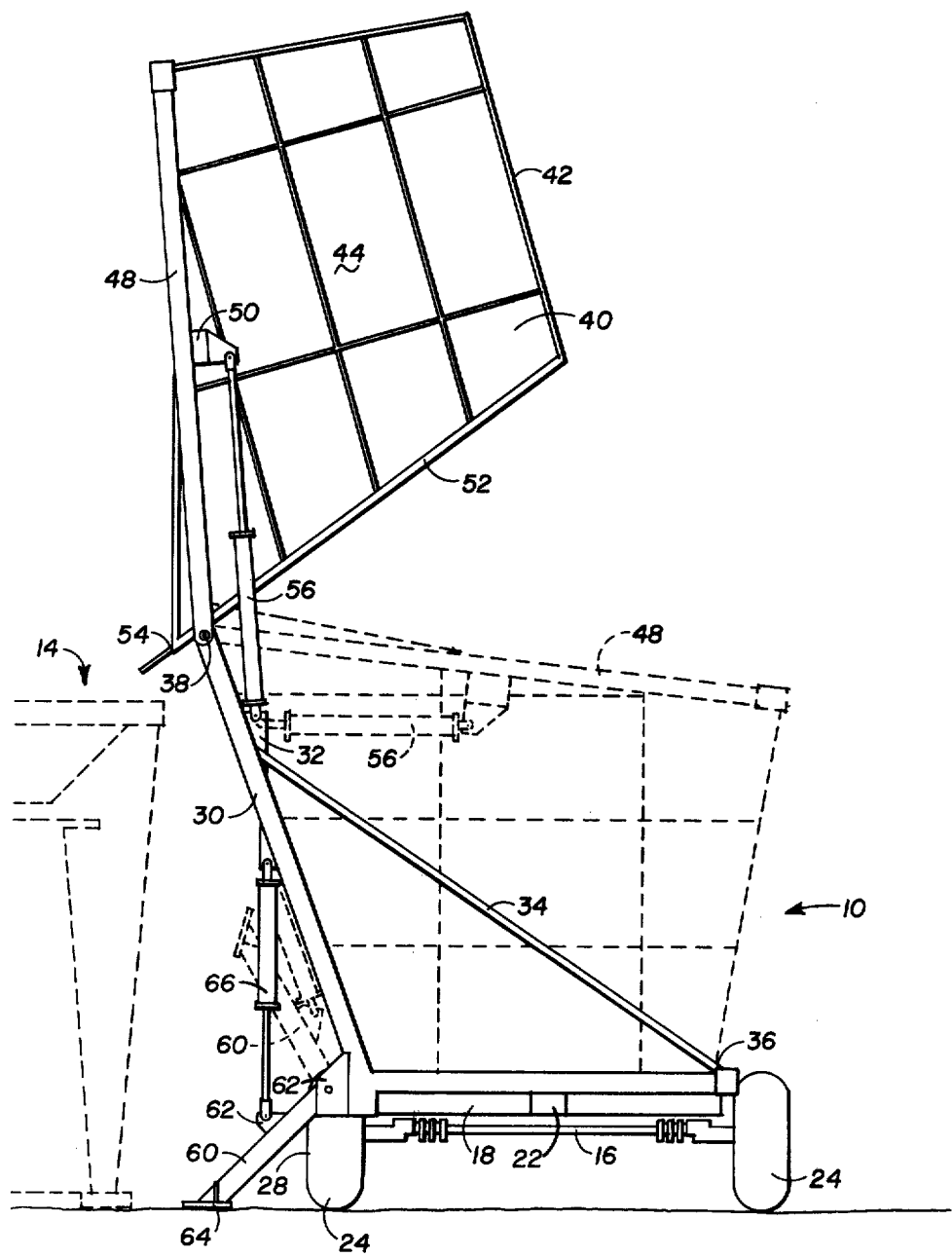
FIG. 1 is a front elevational view of an embodiment of the invention with a module builder partially shown, and the basket shown in a lowered or transport position in phantom line.

Referring to the drawings and more particularly to FIGS. 1, 2, and 3, there may be seen trailer or transport 10 attached to tractor 12 which furnishes power to move the transport 10 to parts of the field where the harvesting operation takes place. The tractor 12 also furnishes a source of hydraulic fluid under pressure. Also shown is module builder 14 with the seed cotton being dumped into it.

The transport has running gear 16 which includes frame 18. The frame has a general rectangular configuration in plan. Front 20 of the running gear has tongue 22 fixed to it. The tongue extends to the tractor 12, as is conventional with trailers. The frame and thus the running gear, is supported by a plurality of ground engaging wheels 24. In the preferred embodiment, there are three wheels on each side at about the center of the trailer, i.e. about half-way between the front 20 and rear 26.

The ground engaging wheels 24 are on the axle so that the axles are self-leveling. This can be accomplished two ways; in one way, the ground engaging wheels can be mounted on straight axles with no springs between the axle and the frame. The other method would be to mount the ground engaging wheels upon spindles which are mounted on crank axles or torsion axles. These axles extend from one side to the other and are mounted for rotation, so that the wheels can move up and down to a limited degree, however, the wheels on both sides are the same. This is important because otherwise with the extreme heavy weight of the cotton in the basket is placed upon a single side, the giving in the springs themselves would cause the frame of the transport to list or lean to one side considerably. Therefore, it is important that the ground engaging wheels be mounted on self-leveling axles.

Although the preferred embodiment is shown with three ground engaging wheels on each side, it would be understood by those skilled in the art that this is a matter of design for the individual load, and a matter of choice for the manufacturer. Of course, there could be less than three ground engaging wheels on each side.

One side of the running gear, and thus the frame, is designated as the stanchion side 28 because stanchions 30 extends upward from the frame. Each of the stanchions has ear 32 attached thereto, at a short distance from the top of the stanchion. Brace 34 extend from the ear 32 to the frame on brace side 36 of the frame 18. The brace side 36 is opposite from the stanchion side 28. One of the stanchions will be at the front corner of the rectangular frame 18, and therefore, will be called the front stanchion, and its brace, the front brace; while the other stanchion will extend down from the after or rear corner, and therefore will be called the after stanchion and its brace, the after brace. Pivot point 38 is at the extreme top of each stanchion. Basket 40 is pivoted to the pivot point 38.

The basket 40 has rectangular, flat bottom 42, which seats upon the frame 18 when the basket is in a retracted or lower or transport position. The side of the basket upon the brace side 36 of the frame will extend upward from the bottom 42. Front end 44 extends upward from the bottom 42 of the basket along the front 20 of the frame. Back end 46 extends upward from the bottom of the basket. Structural member 48 extends transversly of the basket 40 along the top of each the front end 44 and the back end 46 of the basket. Cylinder pad 50 is welded on the lower side of each of the structural members 48. The cylinder pad is about the mid-point of each of the structural members. Sloping side 52 of the basket 40 extends upward from the bottom 42 along the stanchion side 28 of the running gear. The sloping side extends outward at the top. Top edge 54 of the sloping side 52 is pivoted to the pivot points 38 at the top of the stanchions 30.

Referring more particularly to FIG. 1, it may be seen that for the cotton is to be efficiently and effectively dumped into the module builder 14, that the top edge 54 must be overlapped or within the module builder or at least very close thereto. Also, of course, it is necessary not to have a collision between the transport 10 and the module builder 14. Therefore, the top edge 54 or the pivot point 38 will extend outboard or outward from the ground engaging wheels 24 on the stanchion side 28 of the transport 10. The sides of the basket 40, and the bottom 42 also (according to the builders preference), are made of wire mesh or expanded metal lathe or the like for light-weight, and also to permit the escape of fine dust and dirt. However, the sloping side 52 is made of solid sheet metal so that the cotton will readily slide out of the basket when it is in the elevated dump position, as particularly seen in FIG. 1.

Dump hydraulic cylinder 56 extends from the ear 32 to the pad 50. As the cylinder 56 is expanded, it will tilt or raise the basket 40 to the elevated or dump position. Since the edge of the basket extends outboard of the wheels 24, the weight of the basket and the contents thereof is about centered over the stanchion wheels 24 of the trailer 12, adding to the instability of the vehicle.

Those having ordinary skill in the cotton harvesting art, will recognize that the specific embodiment as described to this point is known and embodiments thereof are commercially available upon the market.

According to this invention, I have placed stabilizing arms or legs, or struts 60 to the frame 18 or running gear 16 of the transport 10. Stabilizer ear 62 is attached to the frame at the point where each of the stanchions 30 attach to the frame 18. There is a forward stabilizing strut and an after stabilizing strut 60, each pivoted to one of the ears 62. Each of the stabilizing struts has a pad or foot 64 which will rest firmly and squarely on the ground when the stabilizing strut 60 is extended in the lower position. Forward stabilizing cylinder 66 extends from about mid-point of the forward stanchion 30 to about the mid-point or forward stabilizing strut 60. Likewise after stabilizing cylinder 68 extends from about the mid-point of the after stanchion 30 to the after stabilizing strut 60. When the stabilizing cylinders are fully retracted, the stabilizing struts 60 are in the raised, or elevated position, and fit fairly close, if not snugly, against the stanchions 30. When in the lower or supporting position, the struts will extend outboard from the frame 18 and outboard of the ground engaging wheels 24 and support the running gear 16 on the stanchion side 28.

The tractor 12 not only provides means to two or move the transport 10 from one location to another, but also as a source of hydraulic fluid under pressure. This source of hydraulic fluid under pressure is basically pump 70. Control valve 72 and reservoir 74 are connected to the pump. Extension line 76 extends from the control valve 72 through a one-way restriction valve 78. The extension line 76 is attached to the dump hydraulic cylinders 56 on the extension side. I.e. when the extension line 76 is pressurized, the dump hydraulic cylinders 50 extend to raise the basket. The extension lines is also connected through suitable fittings such as tees to the extension side of the forward stabilizing cylinder 66 and the after stabilizing cylinder 68. I.e., again when the extension line 76 is pressurized, the cylinders expand, thereby lowering the stabilizing struts. Likewise, retraction line 80 extends from the control valve 72 to the retraction side of each of the four cylinders 56, 66, and 68. It may be seen by FIG. 4 that if the control valve 72 is in the neutral or locked position, that there will be no flow through any of the lines, and the units will be locked in their position without movement.

If the valve is in the extension or lift position, that the extension line 76 will be pressurized, and all the cylinders will be extended.

Because of the design of the diameter of the cylinders and the pressure against the cylinders, the stabilizing cylinders will fully extend first. The stabilizing cylinders will extend so the stabilizing strut 60 are firmly biased against the ground before the dump cylinders 56 begin to expand. I.e., that before the basket bottom 42 is ever moved or lifted from the frame 18 that the stabilizing strut 60 will be firmly against the ground to stabilize the running gear 16 of the transport. After the hydraulic fluid has flown into the stabilizing cylinders 66 and 68, an additional fluid from the source of hydraulic fluid under pressure, i.e. pump 70, will cause the dump cylinders to expand, raising or tilting the basket to the dump position.

After the dump cylinders 56 are fully extended, and all the cotton is dumped from the basket 40 into the module builder 14, then moving the control valve 72 into the retract position, will cause the retraction line 80 to be pressurized. At this time the basket begins to lower, but the stabilizing cylinders remain fully extended biasing the stabilizing struts firmly against the ground. This is achieved by maintaining a back pressure upon the extension line 76. This is done by the restriction valve 78. The restriction valve 78 includes valve seat 82 and valve member 84. The valve member 84 has a restricted passageway 86 therethrough. The valve is oriented so that it operates as a check valve. When hydraulic fluid is flowing from the control valve 72 to the extension line 76 the valve 78 will be open and there will be a full flow of hydraulic fluid. However, when the valve is in the retracted position, the fluid will be restricted or restrained, so that only the fluid that will pass through the restricted passageway 86 will return, therefore, there will always be a back pressure upon the retraction line 80 while the basket is being returned, holding the struts against the ground.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

10 transport
12 tractor
14 module builder
16 running gear
18 frame
20 front
22 tongue
24 wheels
26 rear
28 stanchion side
30 stanchion
32 ear, stanchion
34 brace
36 brace side
38 pivot point
40 basket
42 bottom
44 front end of basket
46 back end of basket
48 structural member
50 cylinder paad
52 sloping side
54 top edge
56 dump hydraulic cylinder
60 stabilizing struts
62 stabilizer ear
64 pad or foot
66 fwd. stabilizing cylinder
68 after stabilizing cylinder
70 pump
72 control valve
74 reservoir
76 extend line
78 restrict valve
80 retraction line
82 seat
84 valve member
86 passageway

I claim as my invention:

1. A seed cotton transport having
   a. a running gear,
   b. a stanchion side of the running gear, and
   c. a brace side of the running gear,
   d. a frame as a part of the running gear,
   e. a plurality of ground engaging wheels on the frame,
   f. a tongue on the running gear,
   g. two stanchions extending upward from the frame on the stanchion side,
   h. a pivot point at the top of each stanchion,
   i. an ear on the upper portion of each stanchion below the pivot point,
   j. a brace running from each ear to the brace side of the frame,
   k. a basket,
   l. a flat bottom on the basket which seats upon the frame when the basket is in the transport position,
   m. a brace side on the basket extending upward from the bottom,
   n. a front and back end to the basket extending upward from the bottom,
   o. a structural member extending along the top of each the front and back end of the basket,
   p. a cylinder pad on the lower side of each structural member,
   q. said cylinder pad being at about the mid-point of each structural member,
   r. a sloping side of the basket extending upward from the bottom,
   s. said sloping side on the stanchion side of the running gear,
   t. a top edge of the sloping side pivoted to the stanchions at the pivot point of the stanchions,
   u. said pivot point of the stanchions being outboard of the wheels on the stanchion side of the running gear, and
   v. a dump hydraulic cylinder extending from each ear on the stanchion to the pad on the structural member on the end of the basket,
   wherein the improvement comprises:
   w. a forward stabilizing strut pivoted to the stanchion side of the frame at the front thereof, and
   x. an after stabilizing strut pivoted to the stanchion side of the frame at the rear thereof,
   y. a forward stabilizing hydraulic cylinder having one end connected to about the midpoint of the forward stabilizing strut and the other end connected to about the midpoint of the forward stanchion,
   z. an after stabilizing hydraulic cylinder having one end connected to about the midpoint of the after stabilizing strut and the other end connected to about the midpoint of the after stanchion,
   aa. a source of hydraulic fluid under pressure,
   bb. a control valve connected to the source of hydraulic pressure,
   cc. an extension hydraulic line extending from the control valve to one side of the two dump cylinders and the two stabilizing cylinders,
   dd. a retraction hydraulic line extending from said control valve to the retraction side of the two dump hydraulic cylinders and the two stabilizing hydraulic cylinders, and
   ee. a restriction valve in said extension hydraulic line adjacent to said control valve, including
      (i) a valve seat,
      (ii) a valve member adapted to seat on said valve seat,
      (iii) said valve member having a restricted passageway there through, so that
      (iv) a full flow of hydraulic fluid will pass from the valve to the extension hydraulic line, and only a restricted flow of hydraulic fluid will pass from the extension hydraulic line to the control valve.

2. The invention as defined in claim 1 including limitations a through ee further comprising:
   ff. said ground engaging wheels mounted on self-leveling axles.

* * * * *